(12) United States Patent
Walti et al.

(10) Patent No.: US 9,183,510 B1
(45) Date of Patent: Nov. 10, 2015

(54) METHOD AND SYSTEM FOR PERSONALIZED RECOMMENDATION OF LIFESTYLE ITEMS

(71) Applicant: Tastebud Technologies, Inc., Chicago, IL (US)

(72) Inventors: Christopher Walti, Chicago, IL (US); Tyler Robert Spalding, Chicago, IL (US); Brian Philip Hawkins, Carlsbad, CA (US)

(73) Assignee: Tastebud Technologies, Inc., Chicago, IL (US)

( * ) Notice: Subject to any disclaimer, the term of this patent is extended or adjusted under 35 U.S.C. 154(b) by 212 days.

(21) Appl. No.: 13/646,190

(22) Filed: Oct. 5, 2012

Related U.S. Application Data (60) Provisional application No. 61/542,762, filed on Oct. 3, 2011.

(51) Int. Cl.
*G06F 15/18* (2006.01)
*G06N 99/00* (2010.01)

(52) U.S. Cl.
CPC .................................. *G06N 99/005* (2013.01)

(58) Field of Classification Search
None
See application file for complete search history.

(56) References Cited

U.S. PATENT DOCUMENTS

| | | | |
|---|---|---|---|
| 6,041,311 A * | 3/2000 | Chislenko et al. | 705/26.7 |
| 6,564,202 B1 * | 5/2003 | Schuetze et al. | 1/1 |
| 6,567,797 B1 * | 5/2003 | Schuetze et al. | 1/1 |
| 6,728,752 B1 * | 4/2004 | Chen et al. | 709/203 |
| 6,922,699 B2 * | 7/2005 | Schuetze et al. | 1/1 |
| 7,356,503 B1 * | 4/2008 | Johnson et al. | 705/38 |
| 7,860,862 B2 * | 12/2010 | Slaney et al. | 707/736 |
| 8,732,101 B1 * | 5/2014 | Wilson et al. | 706/15 |
| 2002/0082952 A1 * | 6/2002 | Johnston | 705/27 |
| 2002/0138481 A1 * | 9/2002 | Aggarwal et al. | 707/6 |
| 2003/0063794 A1 * | 4/2003 | Rubinstenn et al. | 382/154 |
| 2003/0065255 A1 * | 4/2003 | Giacchetti et al. | 600/407 |
| 2003/0065589 A1 * | 4/2003 | Giacchetti | 705/27 |
| 2003/0074368 A1 * | 4/2003 | Schuetze et al. | 707/103 R |
| 2003/0074369 A1 * | 4/2003 | Schuetze et al. | 707/103 R |
| 2003/0110181 A1 * | 6/2003 | Schuetze et al. | 707/103 R |
| 2005/0125310 A1 * | 6/2005 | Hazi et al. | 705/27 |
| 2007/0033094 A1 * | 2/2007 | Hartselle | 705/10 |
| 2008/0104111 A1 * | 5/2008 | Slaney et al. | 707/104.1 |
| 2008/0194928 A1 * | 8/2008 | Bandic et al. | 600/306 |
| 2008/0201287 A1 * | 8/2008 | Takeuchi | 706/46 |
| 2008/0294625 A1 * | 11/2008 | Takeuchi | 707/5 |
| 2009/0307168 A1 * | 12/2009 | Bockius et al. | 706/46 |
| 2010/0125492 A1 * | 5/2010 | Lin et al. | 705/14.5 |
| 2010/0324997 A1 * | 12/2010 | Evans | 705/14.69 |
| 2011/0238503 A1 * | 9/2011 | Naini | 705/14.66 |
| 2012/0105874 A1 * | 5/2012 | Chinnici et al. | 358/1.9 |
| 2012/0124052 A1 * | 5/2012 | Furey et al. | 707/740 |

\* cited by examiner

*Primary Examiner* — Kakali Chaki
*Assistant Examiner* — Fuming Wu
(74) *Attorney, Agent, or Firm* — Murray Tech Law; Kenneth A. Murray; Jay S. Jongjitirat (57) ABSTRACT

A browser-based personalized recommendation system and method for lifestyle items comprising style dimension mapping, inputs, outputs, and a computer-algorithm is described. The system gathers information about a user's unique lifestyle preferences, which is then correlated to clothing and lifestyle items. The recommendation system uniquely and directly matches users to discrete items without the need for historic user data.

14 Claims, 10 Drawing Sheets

METHOD AND SYSTEM FOR PERSONALIZED RECOMMENDATION OF LIFESTYLE ITEMS

CROSS REFERENCE TO RELATED APPLICATIONS

This application claims the benefit of U.S. Provisional Application No. 61/542,762, filed Oct. 3, 2011.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND

1. Field of the Invention

The present invention relates to recommendation systems. More particularly, the present invention is related to computer-implemented personalized recommendation methods and systems used for lifestyle items.

2. Related Art

Evaluating lifestyle items is a highly subjective process. People often consider intangible style elements, branding, and public perception of themselves as well as the items in question in determining whether to make a purchase decision. This becomes complicated, in that people look to understand the style of a product, and then, how the product and its style relate to them individually. Since it is difficult to assign a quantitative estimate to style, a straightforward, non data-intensive approach to matching users with unique items has never been accomplished.

Currently, popular pre-existing recommendation systems involve singular value decomposition (SVD), collaborative filtering, attribute based tagging, and data mining algorithms. For singular value decomposition and collaborative filtering, millions of data are collected and then "factors" are mathematically determined between points in attempt to predict future data sets. In the case of Netflix, each user rates individual movies on a scale of 0-5 and then an algorithm attempts to derive how future movies will also be rated. Some of the data employed in this process are movie information and groupings, including genre, date, actors, user queue histories, and a set of user ratings from rented movies.

From this data, an algorithm can match users based on their rating history and the statistical likelihood that their ratings will correlate with those of similar users. Note that the "factors" that link users to ratings are not necessarily predicted in advance; rather the SVD approach determines the statistical significance of causal links after a considerable data set already exists. Despite the success of this system, there are some limitations: (1) it requires a very large initial dataset of user ratings (Netflix uses more than 100 million); (2) prior to obtaining relevant results, users are required to first create a baseline by rating several films; and (3) recommendations are based only on the rated items—users rate movies, and then are recommended movies.

These restrictions are also prevalent in many of the advanced data mining techniques comparing browser cookies, query results, purchasing behavior, and other rating systems. A popular alternative is an attribute based tagging system used by Pandora as part of the Music Genome Project. In this system, songs are manually tagged with over 400 distinct musical attributes such as vocal harmony, pitch, lyrics, and instruments. Users can then choose some of their favorite songs and an algorithm will map user preferences against the database of cataloged songs. As with the aforementioned recommendation systems, this approach also presents some limitations: (1) the user is required to rate a variety of music prior to generating relevant results; (2) the songs are tagged by attributes explicitly related to music, and not potential users (listeners); (3) a sufficient number of attributes for each song is required to provide beneficial results; and (4) recommendations are confined to the types of items rated.

Consequently, a need exists for a flexible personalized recommendation system that does not require an expansive data set to develop reliable recommendations for each individual user of the system.

BRIEF SUMMARY OF THE INVENTION

In view of the foregoing described needs, an embodiment of the present invention includes a recommendation system that satisfies the above needs for a straightforward, non data-intensive approach to matching users with unique items without requiring a large initial dataset or baseline, or requiring the rating of specific items prior to provision of relevant results. The recommendation system uniquely and directly matches users to a variety of results without the need for historic user data. The system and method comprises a software module having a user interface deployed on a web browser across the internet. The software provides an initial user interface tied to several visual choices used as an evaluative first step for determining user style preferences. These selection matrices form the foundation for elements of a computer-implemented algorithm used to develop relevant recommendations for the user. The selections made by the user are processed to develop recommendations specific to the user's preferences for relevant life style items.

BRIEF DESCRIPTION OF THE SEVERAL VIEWS OF THE DRAWINGS

These and other features, aspects and advantages of various embodiments of the present invention will become better understood with regard to the following description, appended claims, and accompanying drawings where:

OBJECTS OF THE INVENTION

A first object of an embodiment of the present invention is to provide a personalized recommendation system and method that provides straightforward, non data-intensive approach to matching users with unique items.

Another object is to provide a personalized recommendation system and method for lifestyle items incorporating intangible style elements, branding, and public perception to provide relevant and accurate results matched to a user's unique preferences.

Another object is to provide a personalized recommendation system and method operable with limited data wherein historic user data is not required to generate accurate results. The first user of the system will receive recommendations equal in quality to any subsequent user of the system.

Another object is to provide a personalized recommendation system and method for lifestyle items in which the user is not required to rate, evaluate, or give preferences for any specific type of item.

Another object is to provide a recommendation system in which the user is uniquely and directly matched to discrete items, as opposed to being assigned to predetermined categories and then shown specific groups of results.

DETAILED DESCRIPTION OF THE INVENTION

The following description is merely exemplary in nature and is in no way intended to limit the invention, its application, or its uses. Before the inventive subject matter is described in further detail, it is to be understood that the invention is not limited to the particular aspects described, as such may, of course, vary. It is also to be understood that the terminology used herein is for describing particular aspects only, and is not intended to be limiting, since the scope of the present invention will be limited only by the appended claims.

Unless defined otherwise, all technical and scientific terms used herein have the same meaning as commonly understood by one of ordinary skill in the art to which this inventive subject matter belongs. Although any methods and materials similar or equivalent to those described herein can also be used in the practice or testing of the inventive subject matter, a limited number of the exemplary methods and materials are described herein.

It must be noted that as used herein and in the appended claims, the singular forms "a," "an," and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

Following is a description of a personalized recommendation system and method 10 applicable to selection and matching of lifestyle items to an individual user's preferences. Lifestyle items can include, but are not limited to, clothing, accessories, jobs, colleges, hotels, food, and cars. For simplicity, the description of the system and method 10 herein focuses on recommendations for men's clothing, although the methodology and approach is the same for all lifestyle recommendations.

Figure 1:
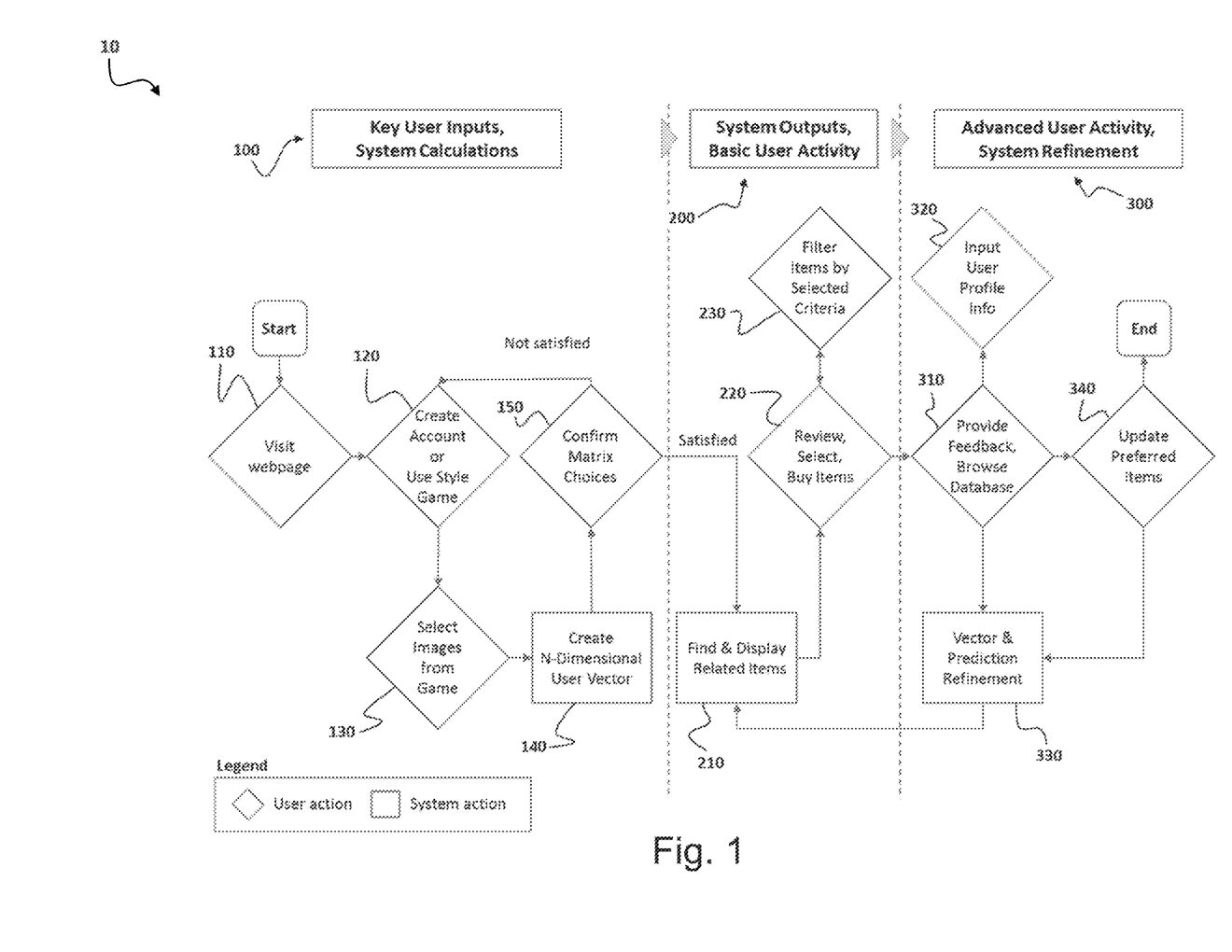
FIG. 1 illustrates a high-level process flow for a recommendation system for lifestyle items according to one embodiment of the present invention.

Referring to FIG. 1, the user, either a man or woman, visits a website 110 or mobile application and is prompted with a set of lifestyle image matrices. The matrices can be randomized, but include categories such as Cars, Movies, Music, Magazines, Cities, Objects, Alcohol Brands, Activities/Sports, Restaurants, and Houses. The user clicks the images he likes 130, and then is recommended clothing items, blog articles, and brands that most correlate to his personal style. In this instance, the user will be shown specific articles of clothing for purchase, blog articles to read, as well as information regarding what clothing brands are most relevant to him.

The major features of this system and method 10 include: (1) no historic user data is required; the first user of the system and method 10 receives recommendations that are equal in quality to all subsequent users of the system and method 10; (2) the user is not required to rate, evaluate, or give preferences for clothing, clothing brands, or anything immediately related to fashion; and (3) the user is uniquely and directly matched to discrete clothing items and brands; he or she is not assigned to predetermined categories and then shown specific groups of products.

This system and method 10 gathers information about a user's unique lifestyle preferences, and then this information is correlated to clothing. The system and method 10 comprises (1) style dimension mapping, (2) inputs, (3) outputs, and (4) algorithm(s).

1. Dimension Mapping—First, the most extreme men's lifestyle characteristics are determined. These characteristics should be mutually exclusive (with little or no overlap) and collectively exhaustive. They can be determined by evaluating the components that define men's lifestyle such as consumer media (online/print/broadcast), entertainment, popular culture, and blogs. From these elements, all clothing styles can be qualitatively and quantitatively categorized.

By creating combinations of these elements, "n" extreme, unique styles have been identified to completely encompass men's fashion. These are considered pure "dimensions" and represent the extreme components of men's fashion. Together, these dimensions (and functions of them) account for all style variants. An analogy is the artist's color wheel, where an infinite number of colors can be mixed from just the primary colors of red, blue, and yellow. Once the primary styles have been identified, individual items can be mapped against these dimensions. For instance, a particular shirt can be labeled as 25% Dimension 1, 50% Dimension 2, and 25% Dimension 3. This shirt is then cataloged in a database with these style dimensions percentages. Note that the shirt is not placed into a specific category; rather it is plotted in the n-dimensional space of the extreme style dimensions. Clothing brands and blog articles can also be mapped in this manner, with an n-dimensional vector pertaining to a specific brand. Due to the expertise required in evaluating the style dimensions, these data entries are performed manually by fashion experts.

When mapping style dimensions for clothing, blog posts, or brands to the system, some of the criteria considered are: (1) structure (sharpness, rigidity); (2) color combinations; (3) texture (material softness, thickness); (4) anchoring and supplemental accessories (such as hats, glasses, ties, shoes, belts, watches, and hair style); and (5) history/origin of the items.

2. Inputs—To compare users to lifestyle items, an n-dimensional vector must also be created for the user. This is done by having the user select lifestyle images that are mapped to the style dimensions. A variety of lifestyle images can be used for this purpose, but the ones chosen for this application are samples from the following categories:

Movies, Cars, Music/Bands, Magazines, Restaurants, Cities/Locations,

Houses/Architecture, Lifestyle Items, Lifestyle Activities, Alcohol Brands

For example, the user is first shown images from popular movies, then images of cars, then restaurants, and so on—with each image mapped in n-dimensional space. After the user makes his selections, the individual image vectors are combined and averaged to form the user input vector.

3. Outputs—The user's vector is then compared to those of products, blog posts, and brands via a computer algorithm, described in greater detail below in section 4. The top matches are recommended to the user to allow for purchase, browsing, and comparison. At this point, the user can buy the items directly from the site or through pre-established affiliate networks via a referral system. The user can also be shown other relevant items such as blog content, brands, "looks", and outfits that map to his style.

The user may opt to perform additional actions such as: (1) liking/disliking items or brands; (2) browse other users "digital closets" who have purchased, searched or own items; (3) "follow" other users based on their choice of style; (4) make comments on items/brands/other user profiles and make recommendations to others; (5) enter personal fit data and measurements, and add their favorite brands to their profile; (6) record comments regarding fit for particular items and brands; and (7) add items that they own or want to a digital closet that other users may view.

As the user goes through these actions, a secondary algorithm may allow for simple additional recommendations such as "see items similar to this." These recommendations will be based on other user actions and provide an additional level of personalization. Additionally, the software will calculate the likelihood that an article of clothing will physically fit a user based on his profile information, and the fit data gathered from other users. For instance if a shirt is owned by user A, and user B has similar body type dimensions (from his profile) the software can recommend that the shirt will also fit user B.

4. Computer-implemented Algorithm—Calculating the correlation between the user and item/brand vectors is nontrivial. The correlation is a computationally expensive process and takes a significant amount of time to compare a user's preferences to thousands of items within the database. A variety of methods may be employed to optimize these calculations, some options include:

a) Normalization and Principal Component Analysis—A relatively common way of comparing items based on vectors is to calculate the Euclidean norm, the difference between pairs of vectors. This permits a relatively simple algorithm to be used: filter all items based on the query (finding, for example, all pants which are beige), then for each item, calculate the score $s=\|i-u\|$, where i is the item's vector, and u is the user's vector. Sort all of the matching items by s (with the lowest values of s at the top), and the results will be sorted in order of matching. Additional optimizations may also be made before using the algorithm against tens of thousands of items and many users.

Searches can also be focused on vectors that may have values clustered among several dimensions, rather than uniformly spaced. This then allows a reasonable way of generating a number of simple sample vectors. Pre-seeded rankings (pre-computations) may also be performed. The pre-computation involves getting each item, computing a score for each possible sample vector, and then storing the item, vector, and score tuple into the database. When running a lookup for items for a user, several steps are performed, including:

1. Find the sample vector nearest to the user.
2. Perform search as normal, selecting items based on user criteria, but sort items based on their score from the sample vector. This is optimized by indexing the sample vector score table by sample vector and item identifier.
3. Select the top K items based on the sorting, where K is the maximum number of results to ever show, and calculate scores for the top K items for each user
4. Re-sort the items returned by their score for the individual user.
5. Return and display the results to the user.

b) Cosine Similarity—Matching may be performed solely on aligned dimensions. The score between a given item vector i and user vector u would be computed using a standard vector dot product.

c) Other Normalization Functions—Other norms may be incorporated within the system and method 10. The Euclidean norm is the most commonly used function, especially in higher dimensions, but others exist. For example, summing each vector component, or taking the maximum component, among others.

d) Look Up Tables and Other Data Structures—The system and method 10 may comprise generating score lookup tables for each user, and other data structures. Data structures such as KD-trees offer efficient lookups of "nearby" items, even in multiple dimensions. Hash tables would similarly allow precomputation of results as an efficient key value store.

FIG. 1 illustrates an embodiment of the recommendation system and method 10. The process first takes key user inputs and performs system calculations 100. At the start, the first user step is Visit Webpage 110. The User visits a webpage, or uses mobile phone application to view page via computer or phone. Next is Create Account or Use StyleGame 120. The user either creates an account or proceeds directly to StyleGame. Next is Select Images from StyleGame 130.

Figure 2:
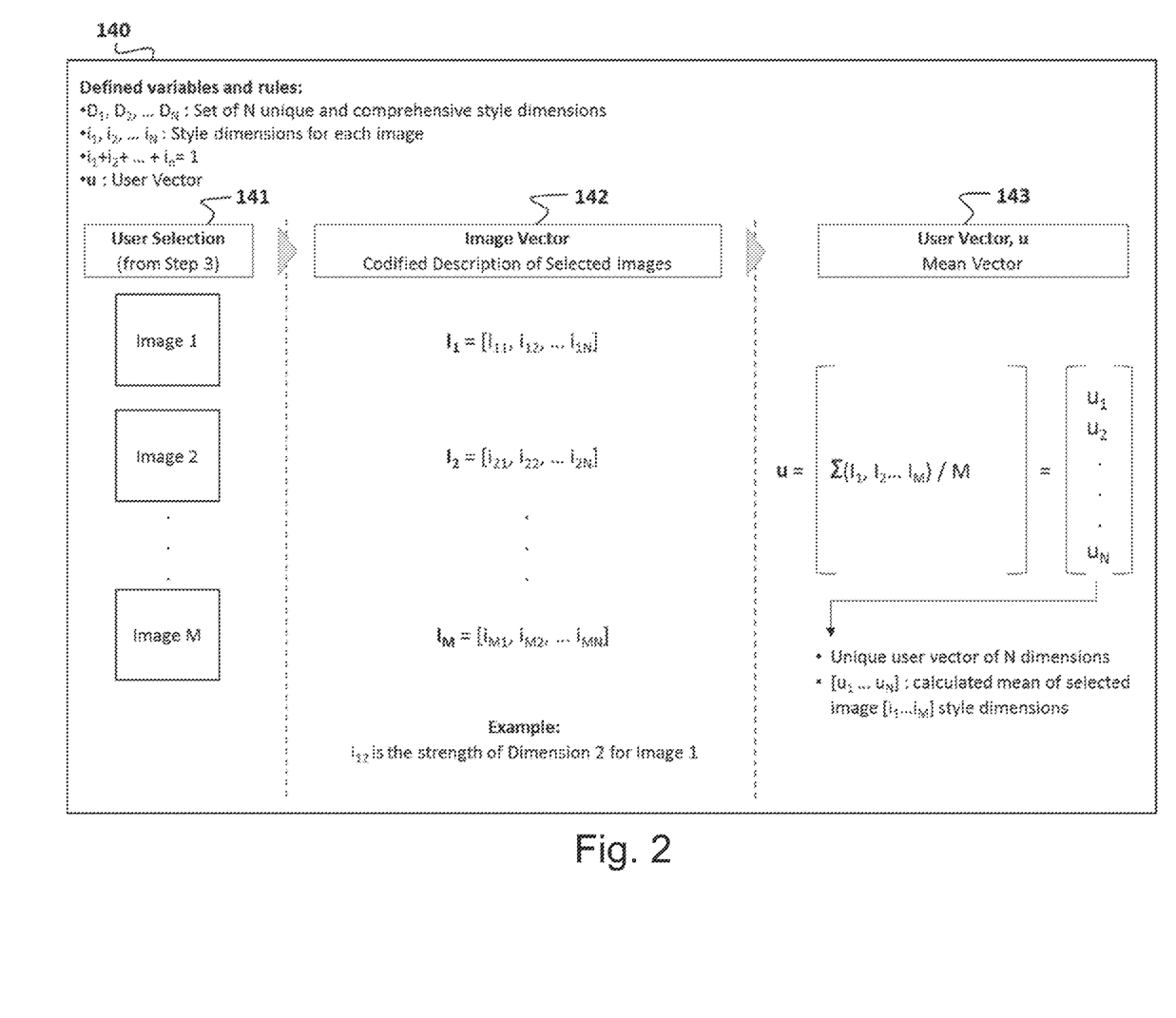
FIG. 2 illustrates the components and process by which a unique user vector of N dimensions is created.

FIG. 2 shows this process in even greater detail. The user interacts with and selects images from matrices of pictures. Next is the system step Create N-Dimensional User Vector 140. As the user selects Images 141, the system stores selections 142 and creates a unique user vector 143 based on inputs. The resulting vector 143 contains N dimensions.

Next is Confirm Matrix Choices 150. The user confirms completion and satisfaction with Image choices, with the option to change any previous selections. Any changes will be reflected in a newly created user vector 143.

Figure 3:
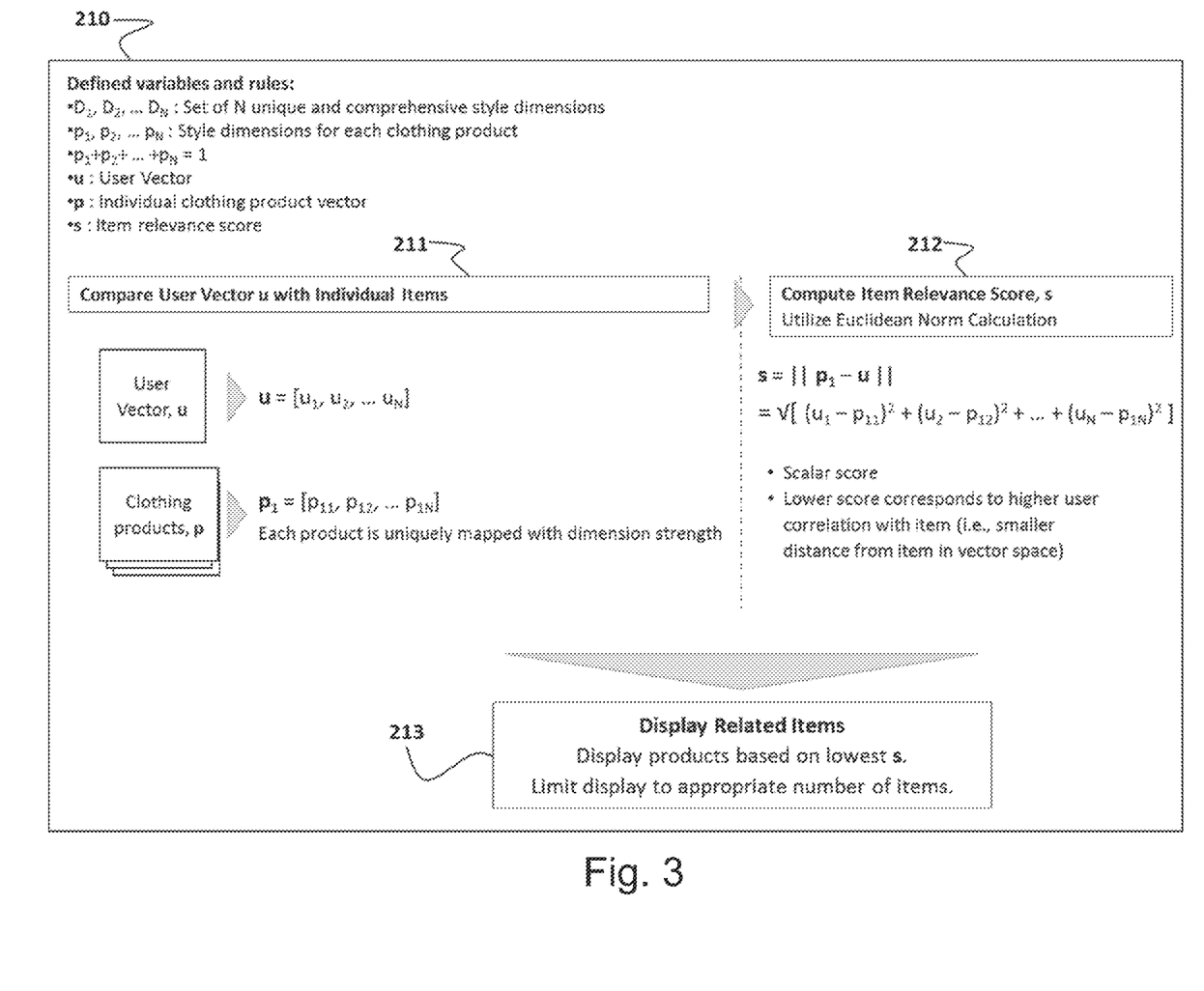
FIG. 3 illustrates the components, process by which the user vector is compared with individual lifestyle products, and by which the relevance of each to the user is computed.

The process then proceeds to System Outputs and Basic User Activity 200. The next system step is Find & Display Related Items 210. FIG. 3 illustrates this step in even greater detail. Upon verification of choices, the computer program of the system searches the database 211 for clothing brands, items, and blog articles most closely related to the user vector 143, and hence, the user. The system 10 then performs a relevance score calculation 212 to assign a rank order to products most related to the user. These ranked results are displayed to the user in order (i.e., most closely matched results displayed first).

Referring again to FIG. 1, the next step available to the user is Review, Select, and Buy Items 220. The user may review items, and click them to learn more or to purchase via affiliate networks, or directly through the site. Alternatively, the user may Filter Items by Selected Criteria 230. The user has the option to filter initial results by style dimension, occasion, or by other standard filters provided (such as color, price, brand, or other options).

The process of the system 10 finally proceeds to Advanced User Activity, System Refinement 300. Here, the next step available to the user is Provide Feedback, Browse Database 310. Upon viewing item(s), a user has the option to provide feedback on an item a number of different ways: rating (like/dislike), commenting, recommending, or other options. Additionally, the user may opt to browse other items in the database (whether related or not), "follow" other users of choice, or simply browse choices made by other users. The next user step is Input User Profile Info 320. As desired, a user may input more detailed profile information such as body information (such as height and weight), brand preferences, price preferences, and fit qualifiers.

Figure 4:
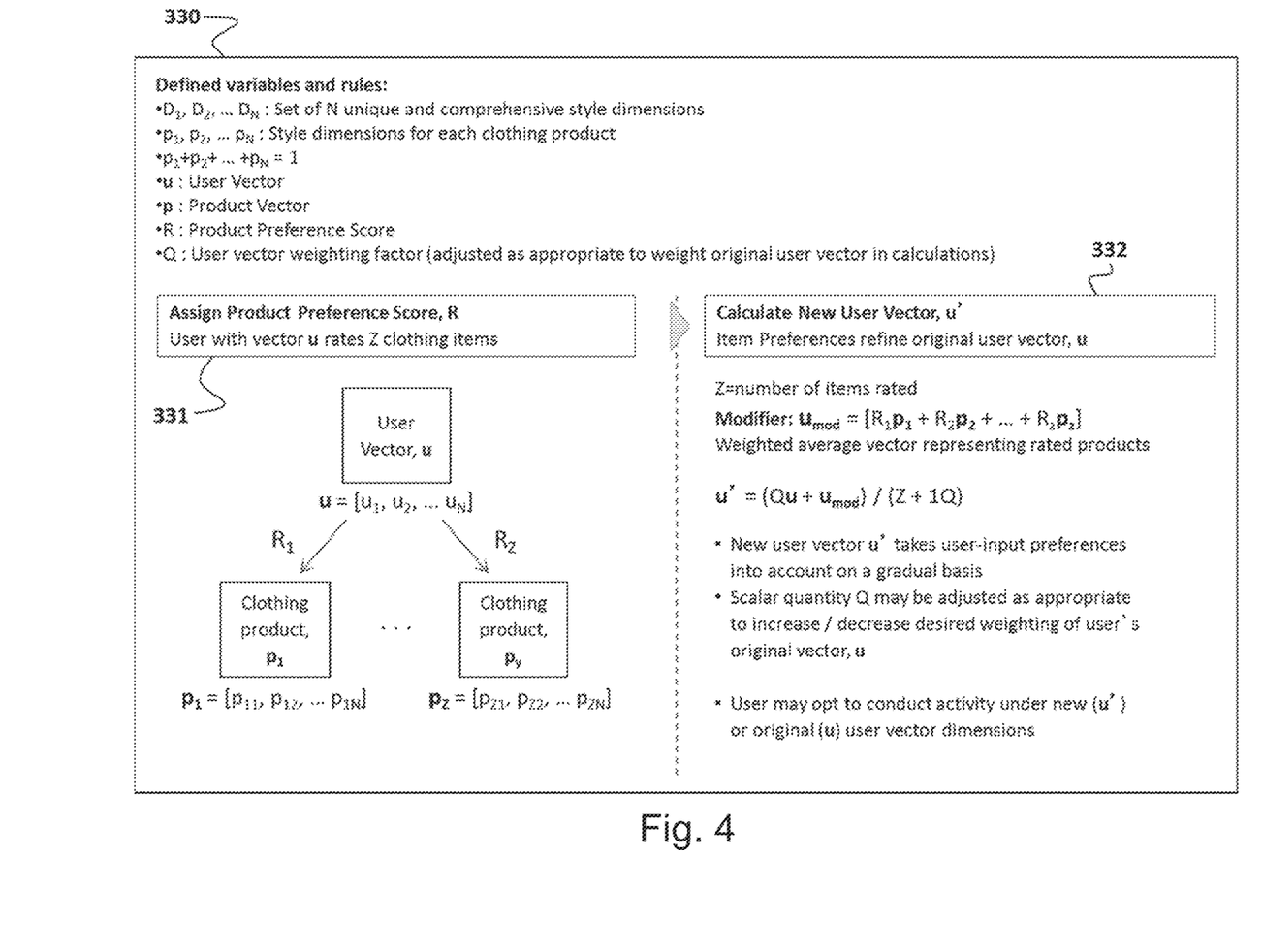
FIG. 4 illustrates the components and process by which item preferences by the user refine the original user vector.

The next system step is Vector & Prediction Refinement 330. FIG. 4 illustrates this step in even greater detail. As user activity, selection, and site input increases, the system 10 dynamically "adjusts" a user's initial vector and related item predictions to account for and reflect these additional inputs. The system 10 assigns an item preference score 331 and then calculates a new user vector 332.

Referring again to FIG. 1, the next system step is Update Preferred Items 340. In addition to automatic vector and prediction updates based on user activity, a user may "force" such updates by changing his or her preferences at any time.

Figure 5:
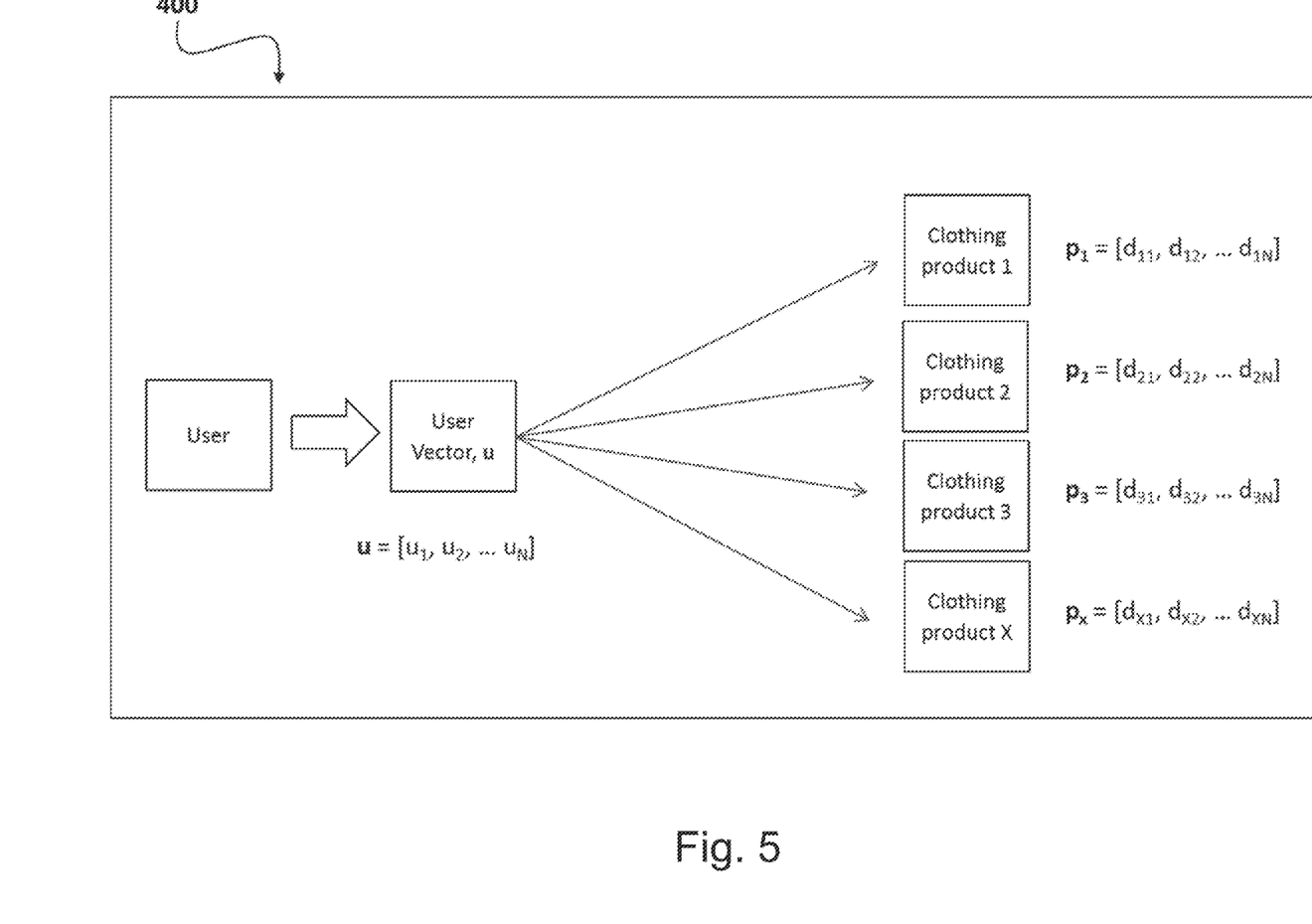
FIG. 5 illustrates the benefits of the recommendation system in terms of initial input and unique and direct mapping of clothing items to the user.
Figure 6A:
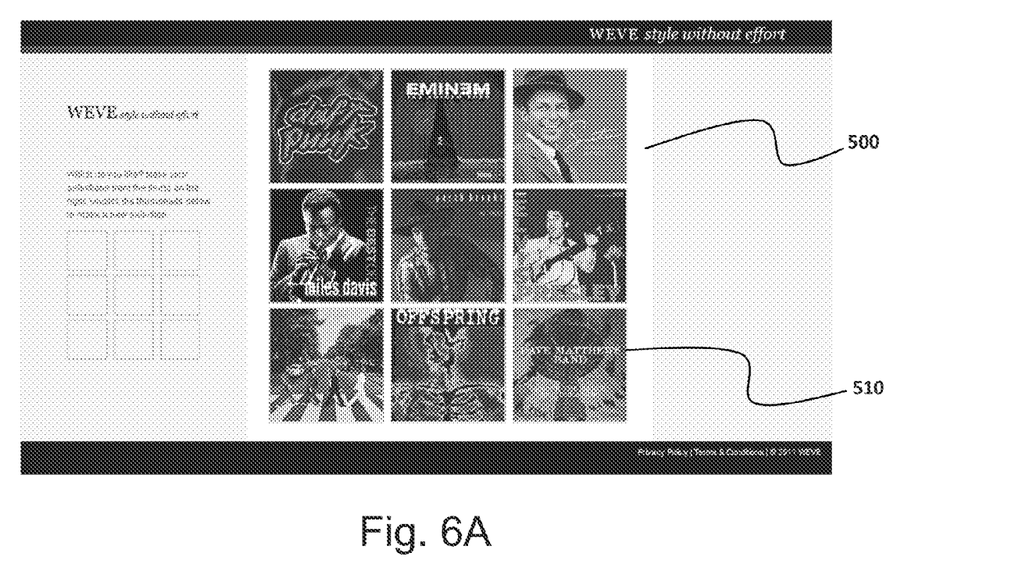
FIG. 6A-I illustrate the user interface of the recommendation system according to one embodiment of the present invention.
Figure 6B:
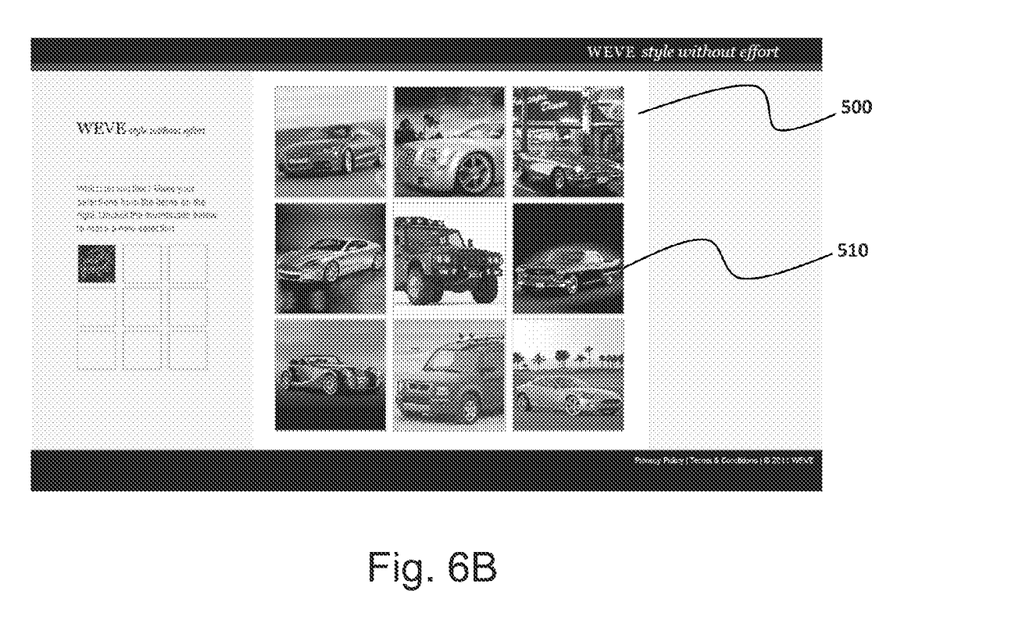
Figure 6C:
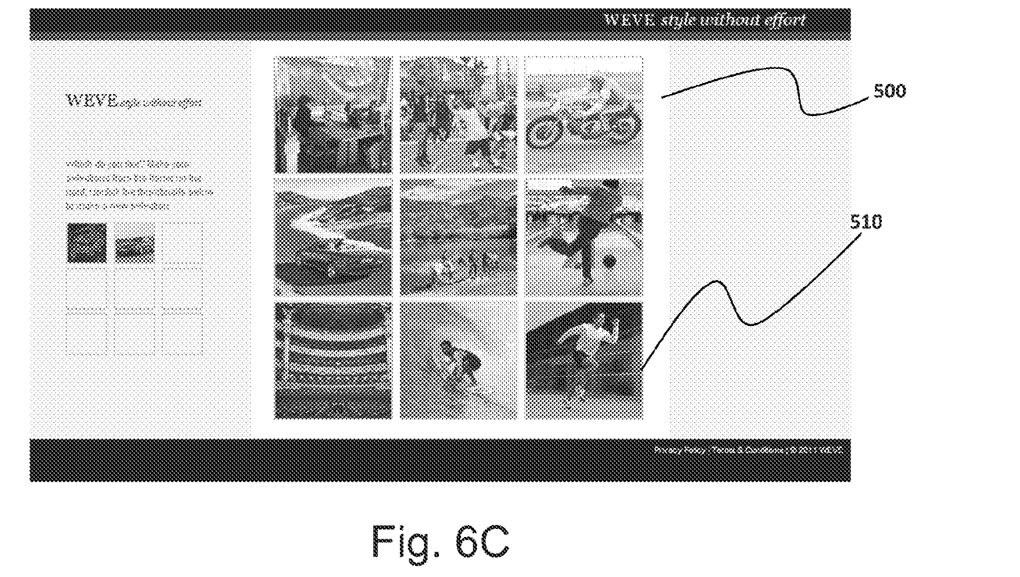
Figure 6D:
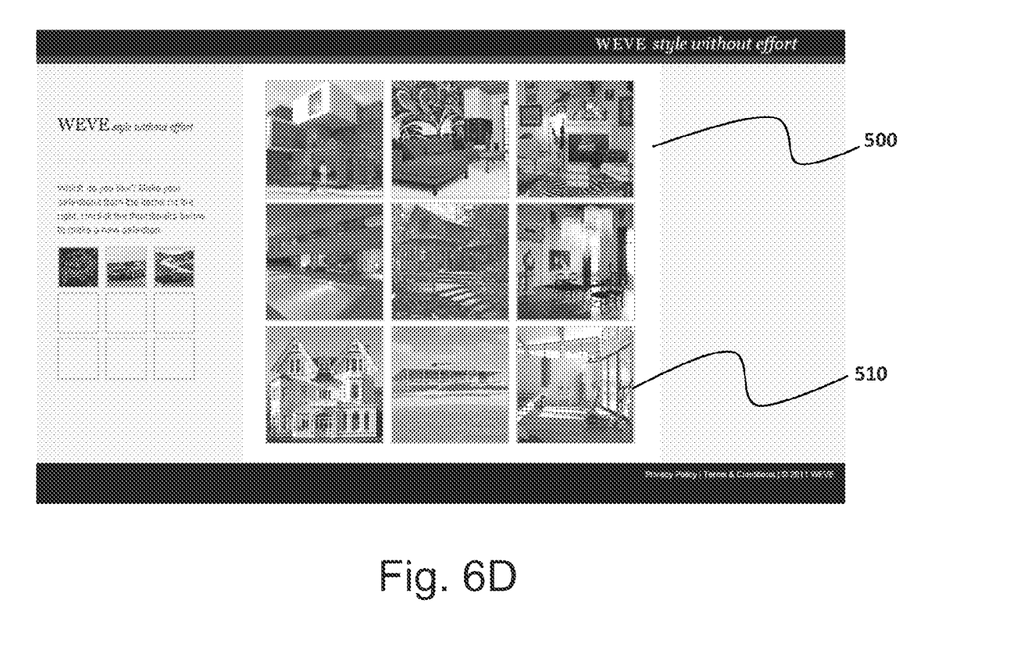
Figure 6E:
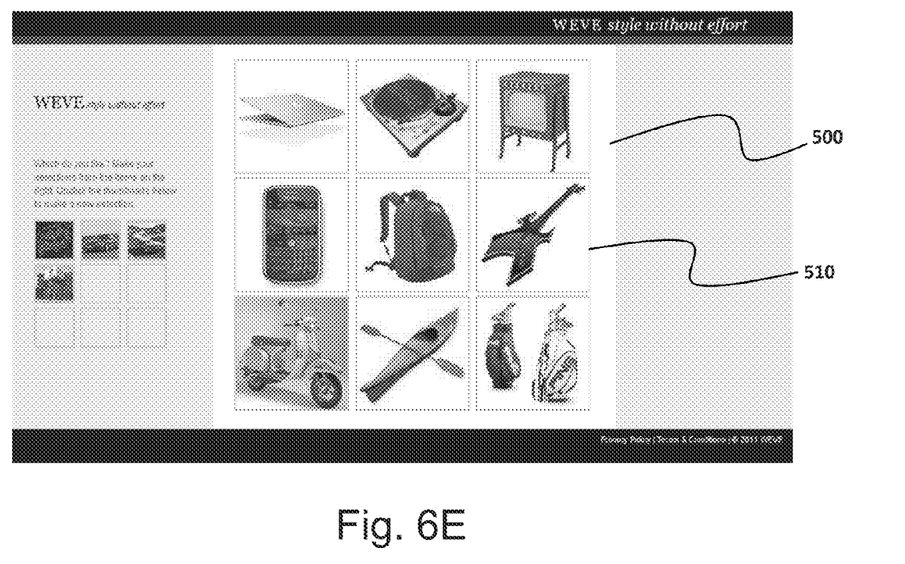
Figure 6F:
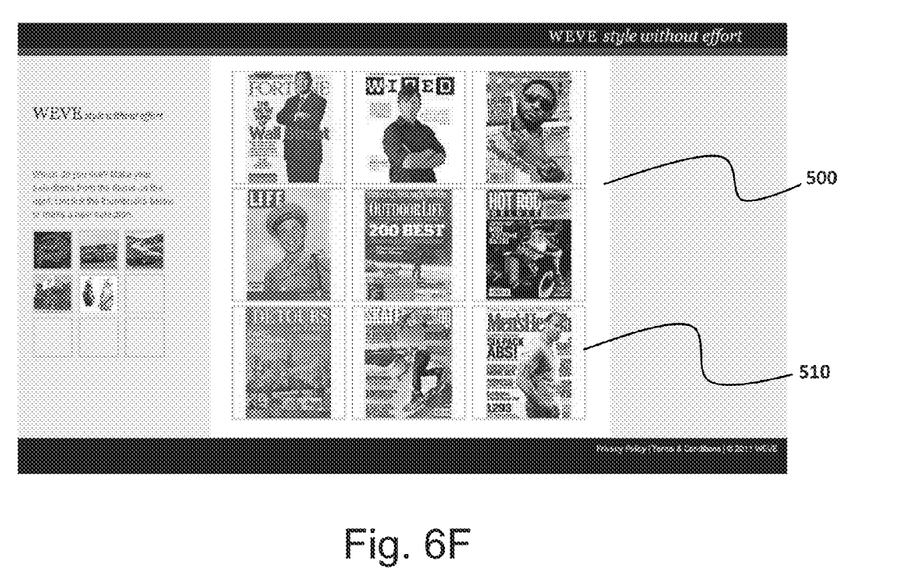
Figure 6G:
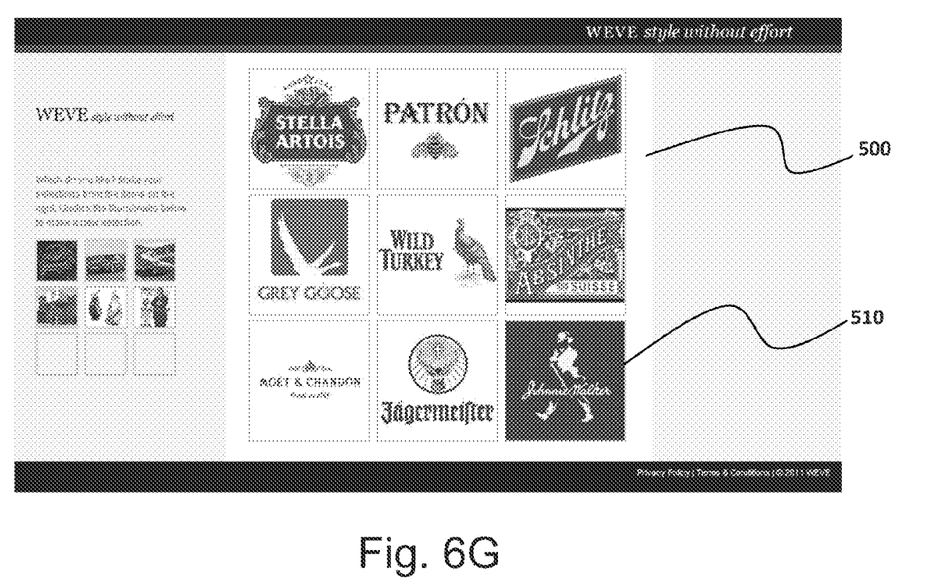
Figure 6H:
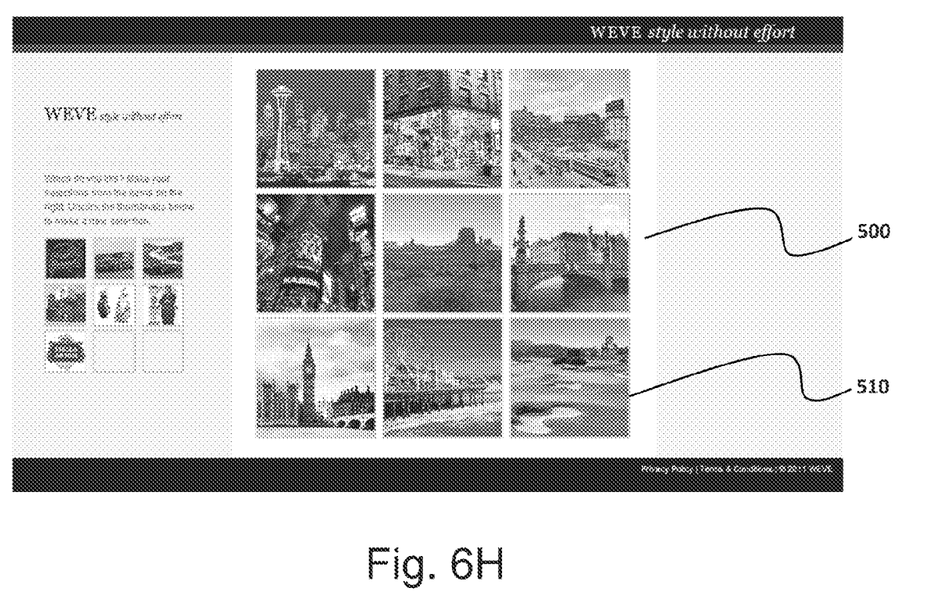
Figure 6I:
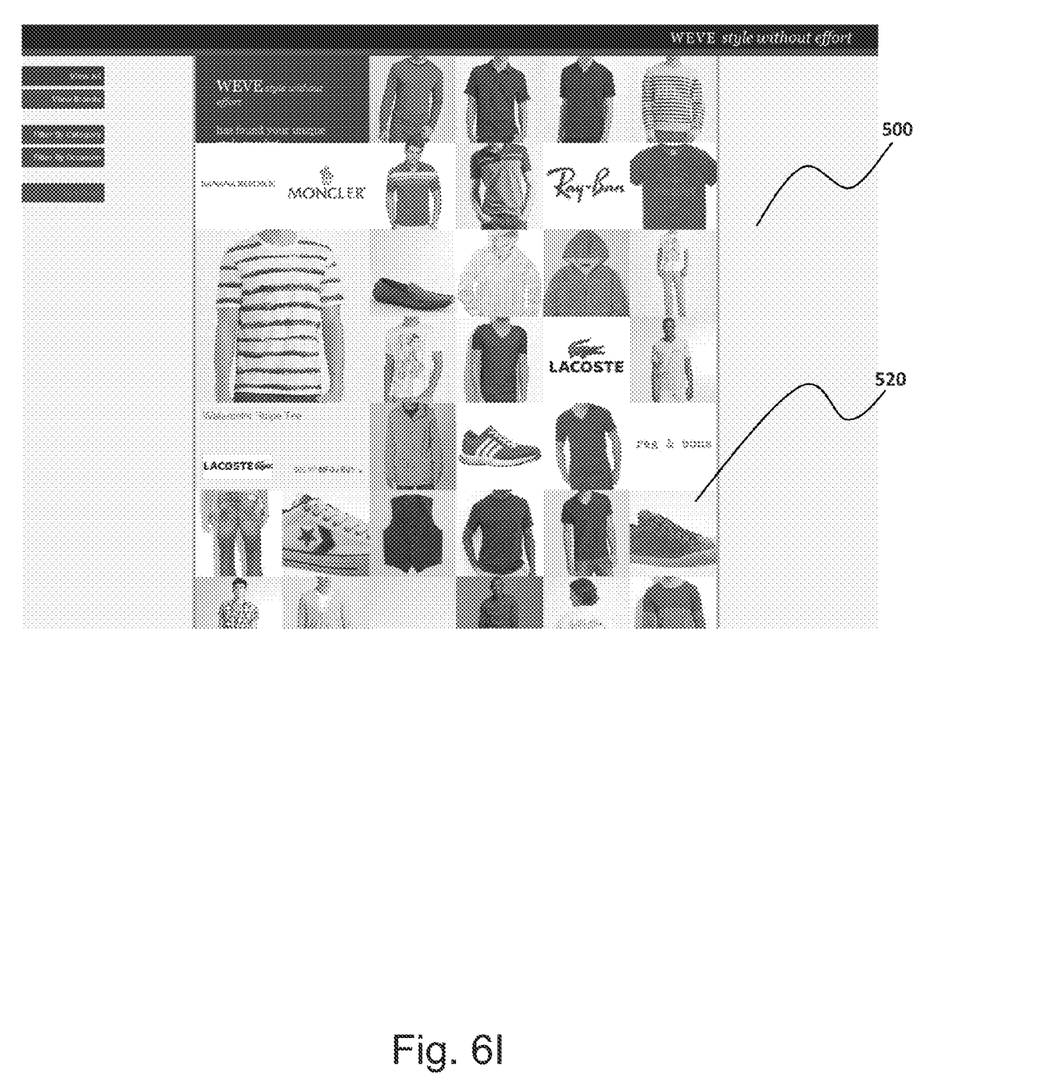

FIG. 5 illustrates the primary features of the recommendation system. Only a small initial input from the user is required. M choices of lifestyle images provide the complete User Vector 143, wherein good results have been demonstrated with M less than 10. The user does not rate clothing items, which eliminates the need for a baseline clothing assessment. The user is uniquely and directly mapped to each clothing item, not to categories, genres, or tags. No historical user or product data is used. The first user of the system 10 will experience results equivalent in accuracy to all subsequent users. No machine learning is required. The item vectors are independent of user interactions FIG. 6A-6H illustrates an exemplary user interface 500 of a preferred embodiment of the recommendation system 10. The image choices 510 presented correspond to the user step Select Items from Matrix 130. FIG. 6I illustrates the user interface 500 displaying the recommended clothing and lifestyle items 520 as a result of the user's selections in the previous choice screens shown in FIG. 6A-6H. This corresponds to the system step Find & Display Related Items 210.

The following are brief descriptions of nine exemplary style dimensions included in the system 10. The system is supportive of a plurality of other style dimensions applied to different lifestyle items.

Dimension 1—This dimension embodies simple structure, basic refinement and focus on comfort and flexibility. It utilizes bright colors, reflective, shiny fabrics and finishes. The clothing structure is more angular with strongly defined lines. Basic elements include alternative styled watches and accessories and the predominant inclusion of electronics (mp3 players, mobile phones) and peripherals such as sunglasses.

Dimension 2—This dimension utilizes heavier gauge fabrics, often with a mixture of leather featuring retrospective messages, product names, or job functions. It is heavily dependent on jackets, outerwear, and footwear elements that appear aged and/or handcrafted—typically devoid of stripes or prints. Basic elements include neckwear, watches, belts, suspenders, and boots. Denim is also one of many elemental fabrics.

Dimension 3—This dimension is characterized by a rugged, masculine individualism and a sense of adventure and exploration. Basic elements include boots, hats, and outerwear all of which feature an aged, distressed, and unstructured finish. The style is far looser fitting and more tailored to physical activity. Textures tend to be more durable, blending natural fabrics such as denim and flannel.

Dimension 4—This dimension emphasizes high refinement, tailored, fitted, and often fastidious detail. Primary elements include untextured fabrics such as stripes, plaids and prints accessorized by neckwear such as bowties and ties. Pants tend to be highly fitted and often socks and footwear are a primary focus along with retrospective hats. Colors vary but tend to be darker and more organic.

Dimension 5—This dimension is geared towards clothing and accessories that guarantee comfort and flexibility. It tends to mix organic colors with bright primary and pastel tones. Fabrics are highly flexible to accommodate a variety of movements and features numerous zippers, buttons, pockets, and hoods. Structure is highly angular with sharp, highly defined, and linear design.

Dimension 6—This dimension is characterized by comfort and loose fit. It features brighter new textures, colors, and finishes, often juxtaposed against a base of black. Key elements often include bright accessories, jewelry, and electronics. This style also includes fabrics primarily of cotton and denim, with use of jackets.

Dimension 7—This dimension is accented by a high quality of shirt and shoe, while minimizing texture with complex structure. Key elements include sport coats, outerwear, and neckwear. Colors tend to vary between more organic olives browns, beiges, blues, and basic blacks grey/ash tones.

Dimension 8—This dimension features comfortable fabrics that are highly refined and simple in their details. Colors consist of white mixed with strong primary colors and navy blues. Key elements include classic eyewear, footwear, sweaters, and scarves.

Dimension 9—This dimension is characterized by a highly emotional introspective and music oriented style. It includes dark to ash denim elements with an emphasis on loose fitting, long vertical structure. Key elements include multiple layers with t-shirt, collared shirt, jacket, and outerwear.

As contemplated herein, various aspects and embodiments of the inventive subject matter can take the form of an entirely hardware embodiment, an entirely software embodiment or an embodiment containing both hardware and software elements. In one embodiment, the inventive subject matter is implemented in software, which includes but is not limited to firmware, resident software, microcode, and other forms.

Furthermore, embodiments of the inventive subject matter can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Some examples of optical disks include compact disc-read only memory (CD-ROM), compact disc read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code are retrieved from bulk storage during execution.

Input/output or I/O devices (including but not limited to keyboards, displays, pointing devices, etc.) can be coupled to the system 10 either directly or through intervening I/O controllers.

Network adapters may also be coupled to the system and method 10 to enable the data processing system to become coupled to other data processing systems or remote printers or storage devices through intervening private or public networks. Modems, cable modem and Ethernet cards are just a few of the currently available types of network adapters.

Thus, specific compositions and methods of the computer-implemented method and system for recommendation system input management have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A computer-implemented method for recommending unlike items to users without requiring historic user data nor rating of specific items, the method comprising the steps of:
    a) determining a set of style dimensions;
    b) mapping a plurality of lifestyle images to said set of style dimensions wherein each mapped lifestyle image has an individual image vector;
    c) mapping a plurality of items to said set of style dimensions to create a database wherein each mapped item has an individual item vector;
    d) deploying a website having a user interface for interaction with users;
    e) presenting a matrix of mapped lifestyle images to a user;
    f) the user choosing one of said mapped lifestyle images from said matrix according to the user's qualitative visual style preference;
    g) repeating steps (e) and (f) until M choices of lifestyle images have been made;
    h) aggregating said individual image vectors of said M lifestyle image choices;
    i) processing and transforming said aggregated individual image vectors of said M lifestyle image choices using software configured to run on a computer processor to generate a user vector, said user vector representative of the user's style;
    j) comparing and applying said user vector to individual item vectors in said database via a computer-implemented algorithm to identify and recommend discrete items to the user; and
    k) presenting said discrete items to the user for potential selection and additional action.

2. The method of claim 1 wherein said lifestyle images mapped to said set of style dimensions to create individual image vectors are chosen from any of categories:
    a) movies;
    b) cars;
    c) music;
    d) bands;
    e) magazines;
    f) restaurants;
    g) cities;
    h) locations;
    i) houses;
    j) architecture;
    k) lifestyle items;
    l) lifestyle activities; and
    m) alcohol brands.

3. The method of claim 1 wherein M equals 9.

4. The method of claim 1 wherein said set of style dimensions consist of:
    a) Dimension 1;
    b) Dimension 2;
    c) Dimension 3;
    d) Dimension 4;
    e) Dimension 5;
    f) Dimension 6;
    g) Dimension 7;
    h) Dimension 8; and
    i) Dimension 9.

5. The method of claim 1 wherein said discrete items may be from dissimilar categories and include products, outfits, blogs, blog content, brands, consumer media, entertainment, popular culture, looks, and other users.

6. The method of claim 1 wherein said lifestyle images mapped to said set of style dimensions to create individual image vectors are chosen from any of categories:
    a) movies;
    b) cars;
    c) music;
    d) bands;
    e) magazines;
    f) restaurants;
    g) cities;
    h) locations;
    i) houses;
    j) architecture;
    k) lifestyle items;
    l) lifestyle activities; and
    m) alcohol brands.

7. A digital computer programmed to compare unlike items and carry out the steps of:
    a) establishing an N-dimensional space;
    b) mapping characteristics of items to said N-dimensional space to create an N-dimensional item vector for each said item;
    c) mapping characteristics of images to said N-dimensional space to create an N-dimensional image vector for each said image;
    d) displaying one or more image selection matrices to a user via a web browser communicating across a network;
    e) the user selecting M images from said one or more image selection matrices;
    f) processing said image vectors of said selected M images to create an N-dimensional user vector;
    g) comparing said N-dimensional user vector to each said N-dimensional item vector;
    h) selecting and organizing each of said items wherein said N dimensional item vector associated with each of said items is most closely correlated to said N-dimensional user vector; and i) displaying images of said most closely correlated items to the user for selection and further action.

8. The system of claim 7 wherein N equals nine.

9. The system of claim 8 wherein said nine style dimensions are any of:
   a) Dimension 1;
   b) Dimension 2;
   c) Dimension 3;
   d) Dimension 4;
   e) Dimension 5;
   f) Dimension 6;
   g) Dimension 7;
   h) Dimension 8; and
   i) Dimension 9.

10. The digital computer of claim 7 wherein each of said mapping steps is carried out via a computer-implemented algorithm.

11. The digital computer of claim 10 wherein said comparing step is carried out via a computer-implemented algorithm.

12. The digital computer of claim 11 wherein said computer-implemented algorithm is optimized via any of:
   a) normalization;
   b) principal component analysis;
   c) Euclidean norm;
   d) cosine similarity;
   e) summing;
   f) maximum;
   g) look up tables;
   h) KD-trees; and
   i) hash tables.

13. The digital computer of claim 12 wherein said user vector is refined by additional user selections.

14. The digital computer of claim 13 wherein M equals nine.

\* \* \* \* \*